United States Patent [19]
Mlyniec et al.

[11] Patent Number: 5,923,335
[45] Date of Patent: Jul. 13, 1999

[54] COMPUTER GENERATED OBJECTS HAVING MAGNETS AND TARGETS

[75] Inventors: Paul Kenneth Mlyniec, Los Gatos; Daniel Paul Mapes, Cupertino, both of Calif.

[73] Assignee: MultiGen, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/668,066

[22] Filed: Jun. 19, 1996

Related U.S. Application Data

[60] Provisional application No. 60/011,272, Feb. 7, 1996.

[51] Int. Cl.⁶ ........................................ G06T 17/00
[52] U.S. Cl. .................................. 345/433; 364/468.02
[58] Field of Search ........................ 345/419, 420, 345/433, 437, 438, 474, 121, 339, 348; 364/468.02, 468.03, 468.04, 474.24, 474.28, 474.84

[56] References Cited

U.S. PATENT DOCUMENTS

| | | | |
|---|---|---|---|
| 4,641,270 | 2/1987 | Lalloz et al. | 364/468.04 |
| 5,019,961 | 5/1991 | Adesso et al. | 364/192 |
| 5,251,290 | 10/1993 | Pabon | 345/420 |
| 5,331,579 | 7/1994 | Maguire, Jr. et al. | 364/578 |
| 5,355,314 | 10/1994 | Feigenbaum | 364/420 |
| 5,363,320 | 11/1994 | Boyle et al. | 364/578 |
| 5,368,484 | 11/1994 | Copperman et al. | 434/69 |
| 5,373,457 | 12/1994 | George et al. | 364/578 |
| 5,386,507 | 1/1995 | Teig et al. | 345/348 |
| 5,404,319 | 4/1995 | Smith et al. | 364/578 |
| 5,416,729 | 5/1995 | Leon et al. | 364/578 |
| 5,422,834 | 6/1995 | Horiuchi et al. | 364/578 |
| 5,424,964 | 6/1995 | Machala, III et al. | 364/578 |
| 5,428,559 | 6/1995 | Kano | 706/23 |
| 5,444,836 | 8/1995 | Hollingsworth et al. | 345/435 |
| 5,463,722 | 10/1995 | Venolia | 345/157 |
| 5,510,995 | 4/1996 | Oliver | 364/474.24 |
| 5,513,303 | 4/1996 | Robertson et al. | 345/419 |
| 5,572,639 | 11/1996 | Gantt | 345/433 |
| 5,594,651 | 1/1997 | St. Ville | 364/468.04 |
| 5,701,403 | 12/1997 | Watanabe et al. | 345/419 |

OTHER PUBLICATIONS

Gottschlich et al., "Assembly knowledge prepresentation for assembly motion planning and execution", Intelligent Control, 1990 International Symposium, pp. 948–956.

Hanna et al., "Relational computer–aided design", IEEE Colooq. No. 231: Design Systems with Users in Mind, 1995, pp. 3/1–3/3.

Radack et al., "Positioning features within the rapid design system", Systems Engineering, 1991 IEEE International Conference, pp. 38–41.

Daniel P. Mapes, "Two Handed Virtual Environment Interface Improving Productivity for Object Manipulation and Viewpoint Movement in 3D Worlds," 1993, Masters Project: Department of Computer Science College of Arts and Sciences University of Central Florida, (93 Pages).

Mapes et al., "3D Object Manipulation Techniques Immersive vs Non–Immersive Interfaces," Feb. 1995, SPIE Photonics West Proceedings, (8 Pages).

Mlyniec et al., "Increased Productivity through Model-time™ Behaviors," The Engineering Reality of Virtual Reality: SPIE 2409, 1995, (5 Pages).

"SmartScene™ Modelers Guide v1.0 Comment Field Implementation For Beta," Dec. 6, 1995, Multigen Inc., (16 Pages).

"SmartScene™ Modeler's Guide, Beta Version 1.0," Dec. 1995, Multigen Inc., pp. 1–16.

Modeler's Guide Revision 14.0, Mar. 1994, Multigen Inc., pp. i–308.

*Primary Examiner*—Stephen S. Hong
*Attorney, Agent, or Firm*—Beyer & Weaver, LLP

[57] ABSTRACT

A computer-implemented method for generating objects configured for assembly into a scene during assembly time. The method includes the step of associating a magnet with a first object. Further, the method includes the step of associating a target with a second object. The magnet is configured to search for the target within a predefined search range when the magnet is activated. The magnet and the target have alignment data for permitting the first object and the second object to align themselves relative to each other in accordance with the alignment data during the assembly time.

22 Claims, 9 Drawing Sheets

| | VECTOR | SEARCH RANGE | ATTRIBUTE TO BE SEARCHED |
|---|---|---|---|
| POSITION MAGNET PRIMITIVE | POSITION VECTOR | SPHERE | ANY ATTRIBUTE THAT CAN BE SEARCHED |
| TORSION MAGNET PRIMITIVE | PURE VECTOR | CONE | ANY ATTRIBUTE THAT CAN BE SEARCHED |

|  | POSITION TARGET Primitive | TORSION TARGET Primitive |
|---|---|---|
| TARGET GEOMETRY | • POINT(S)<br>• LINES<br>• PLANES<br>• GENERIC SURFACES<br>• GENERIC VOLUMES | PURE VECTOR |
| TARGET ATTRIBUTE APPLIED TO TARGET GEOMETRY | ANY ATTRIBUTE THAT CAN BE SEARCHED | ANY ATTRIBUTE THAT CAN BE SEARCHED |

FIG. 9

| DEPENDENT COMPOSITE MAGNET | COMPONENT MAGNET PRIMITIVES |
|---|---|
| PIN_HELPER | 1. POSITION MAGNET<br>2. TORSION MAGNET |
| WELD_HELPER | 1. POSITION MAGNET<br>2. TORSION MAGNET A<br>3. TORSION MAGNET B |

FIG. 10

COMPUTER GENERATED OBJECTS HAVING MAGNETS AND TARGETS

This application claims priority under 35 U.S.C 119 (e) of a provisional application entitled "Model Associated Attributes" filed Feb. 7, 1996 by inventors Paul Kenneth Mlyniec and Daniel Paul Mapes (Application Ser. No. 60/011,272)

BACKGROUND OF THE INVENTION

The present invention relates to computer generated images. More specifically, the present invention relates to improved methods and apparatus for modeling computer-generated objects and assembling them to create scenes.

Due to their powerful data processing capabilities, computers have long been employed for generating complex still images and animation sequences. In the generation of a flight simulation animation sequence, for example, a computer may be employed to first create a set of component objects, such as the ground plane, trees, hills, buildings, and the like. The component objects may then be assembled into one or more scenes. Once the scenes are assembled, an airplane may be disposed therein during the execution of the flight simulation program to give the visual illusion of flight.

In the prior art, the task of creating the set of computer-generated objects, such as the aforementioned trees and hills, as well as the task of assembling those objects into scenes typically involves a substantial amount of time and effort. For discussion purposes, FIG. 1 depicts an exemplar prior art process for generating a simple scene that may include objects such as trees, houses, bridges, and the like.

In the prior art process of FIG. 1, a modeler 50, representing the person who, through his familiarity with the subject to be modeled, conceptualizes the scene to be created and the objects contained therein. The objects and scenes are modeled by the modeler, typically through a modeling program, results in a set of specifications (52) for the modeled objects. The set of model objects specifications (52) may include general characteristics such as the colors, shapes, textures of objects, and the like. Once created, the set of specifications (52) may then be transmitted to a programmer (54). The programmer (54) represents the person who possesses the necessary computer programming skills to translate the set of specifications (52), which is provided by the modeler (50), into a computer database of objects (56).

The modeler (50) may also furnish the rules regarding object orientation and object spatial relationships to the programmer (54). The programmer (54) may then hardcode the provided instructions, along with these rules, into the programmed instructions (56). For example, the programmer (54) may calculate the point representing the bottom end of a tree trunk and the vector at this point for the purpose of aligning the tree in the upright direction. These independently derived calculations may then be hardcoded, in a customized manner, into the programmed instructions. These programmed instructions allow the assembler (58) to assemble a given tree with the ground plane, with the tree in its upright position and the bottom end of its trunk disposed at some predefined location in the ground plane of the scene. As the term is used herein, the assembler represents the person who employs the programmed instructions provided by the programmer to put the specific scenes together. The predefined location represents one of the locations specified in advance by the programmer in the prior art to indicate where a specific object may be disposed, e.g., where the tree is allowed to be in the assembled scene.

Although the prior art method achieves its objective of creating scenes from objects modeled by the modeler, there are many disadvantages. For example, unless the modeler also understands computer programming techniques (or the computer programmer happens to be well-versed in the technical details of the subject to be modeled), the modeler must typically spend a great deal of time educating the programmer in the particulars of the objects to be modeled. For some complex images, e.g., those related to aforementioned biomedical field, the amount of time invested on the part of the modeler to ensure that the programmer correctly creates a database of objects may be quite substantial.

In the prior art process of FIG. 1, the modeler must invest a substantial amount of time to ensure that the programmer correctly understood the rules regarding the objects' orientation and spatial relationships, and that the programmer correctly hardcodes these rules into the programmed instructions. Further, the modeler must also spend another substantial amount of time to ensure that the assembler understands how the specific objects are to be assembled in the assembled scene, especially in the fine details of their orientation and spatial alignments. As can be appreciated from the foregoing, even if skilled programmers and skilled assemblers are available and are capable of understanding the particulars of the modeled objects from the modeler, the prior art processes are at best inefficient.

Further, the prior art approach requires customized software programs for generating and assembling objects. This is because the relationship among objects must be hardcoded in the prior art, e.g., the programmer must write specific programmed instructions to cause a bridge object to exhibit the specific behavior of looking for a river object and aligning itself across the river in a specific manner. Because of this customized approach, a program suitable for assembling an image of, for example, a part of a city, cannot be employed to assemble an image of, for example, an automobile engine. When a new scene involving new objects needs to be assembled, the customized approach of the prior art necessitates the extensive rewriting of the existing program, or the writing of a completely new program. As is known, such customization typically involves great expenditures in terms of time and effort, thereby making scene creation in the prior art a costly undertaking.

In view of the foregoing, what is desired are improved methods and apparatus for modeling computer-generated objects and assembling them to create scenes.

SUMMARY OF THE INVENTION

The invention relates, in one embodiment, to a computer-implemented method for generating objects configured for assembly into a scene during assembly time. The method includes the step of associating a magnet with a first object. Further, the method includes the step of associating a target with a second object. The magnet is configured to search for the target within a predefined search range when the magnet is activated. The magnet and the target have alignment data for permitting the first object and the second object to align themselves relative to each other in accordance with the alignment data during the assembly time.

In another embodiment, the invention relates to a computer implemented method for assembling a first object and a second object into a scene. The method includes the step of applying a magnet to a first geometry, the first geometry being associated with the first object. The invention further includes the step of applying a target to a second geometry, the second geometry being associated with the second object. There is further included the step of activating the magnet upon a predefined condition, thereby permitting the magnet to search for the target within a predefined search range. The magnet completes its predefined behavior with respect to the target if a search by the magnet is successful, thereby aligning the first object and the second object relative to each other in accordance with alignment data contained in the magnet and the target.

In yet another embodiment, the invention relates to a computer implemented method for assembling a scene. The method includes the step of providing a first object, the first object having an associated target. Further, there is included the step of providing a second object, the second object having an associated magnet. The magnet is configured to search for the target within a predefined search range when the magnet is activated. The magnet and the target have alignment data for permitting the first object and the second object to align themselves relative to each other in accordance with the alignment data.

These and other advantages of the present invention will become apparent upon reading the following detailed descriptions and studying the various figures of the drawings.

BRIEF DESCRIPTION OF THE DRAWINGS

FIG. 9 illustrates, in accordance with one aspect of the present invention, the sets of parameters that may be employed to define a position target primitive and a torsion target primitive.

FIG. 10 illustrates some exemplar dependent magnet composites.

DETAILED DESCRIPTION OF THE PREFERRED EMBODIMENTS

This application incorporates by reference the provisional application filed Feb. 7, 1996 entitled "Model Associated Attributes" by inventors Paul Kenneth Mlyniec and Daniel Paul Mapes (Application Ser. No. 60/01,272). In this application, an invention is described for, among others, modeling computer-generated objects and assembling the computer-generated objects to create scenes. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there is provided an improved technique for permitting a modeler to specify, in connection with a given object at model time, the assembly point(s) and assembly-time behavior of that object relative to one or more objects in the database. The specification of the assembly point(s) and behavior by the modeler at model time are achieved, in one embodiment, through primitive(s) applied to geometric features associated with objects. One of the primitives applied (herein "the magnet primitive") may be specified to search, when it is activated, only other specifically designated primitives (herein "the target primitive") in the database. To clarify, model time, as the term is used herein, generally refers to the point in the scene creation process wherein the objects are modeled, typically by the modeler through some conventional modeling program. In contrast, assembly time generally refers to the point in the scene creation process wherein the objects are assembled into scenes.

By choosing the appropriate magnet primitive type to apply to objects, the modeler may advantageously determine in advance the assembly-time behavior that the object associated with the magnet primitive (herein "the magnet object") may exhibit when the magnet primitive finds the target primitive and completes its behavior vis-à-vis the target object, i.e., the object with which the target primitive is associated. Thus, the application of primitives to objects accomplishes at least two purposes: defining the target object among all other objects in the database for a particular magnet object, and defining the behaviors of these objects during assembly.

Figure 1:
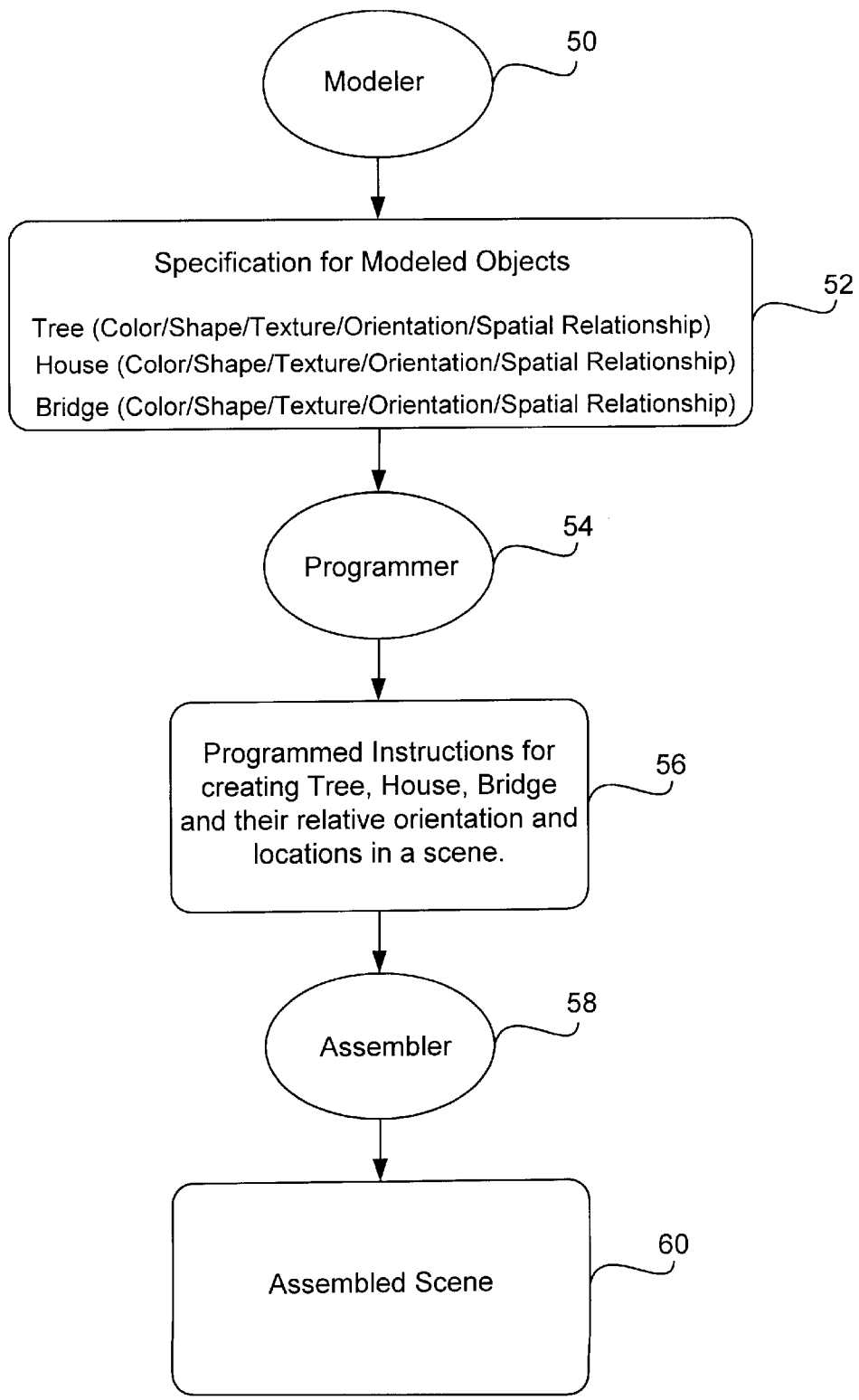
FIG. 1 depicts a prior art process for generating a scene.
Figure 2:
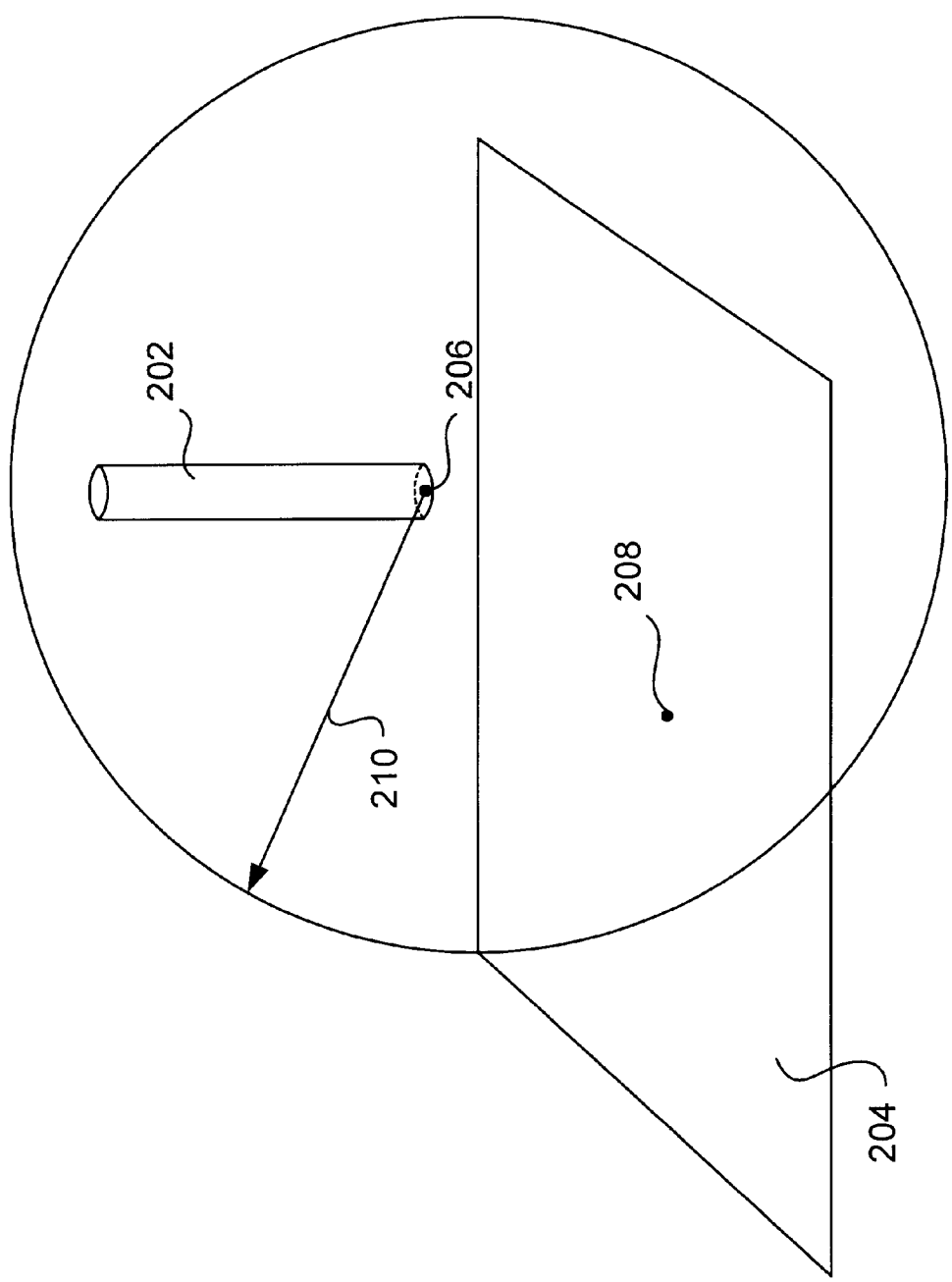
FIG. 2 depicts two simple objects to be assembled in a scene to facilitate a discussion of the inventive concept of primitives.

The concept of primitives may be better understood with reference to FIG. 2. In the description that follows, objects which have been generated in advance in accordance with the specifications provided by the modeler (e.g., shape, color, texture, and the like) and the primitives applied by the modeler are graphically shown to facilitate discussion. As will be apparent in the discussion herein, however, the invention also resides in part in the modeling phase, which precedes the generation of the objects in a scene and their assembly. It should also be borne in mind that although the term "object" is used herein to describe an entity that may be visually rendered and assembled into scenes, it is not intended that the invention be limited to what is commonly referred to in contemporary literature as "object-oriented" approaches to software implementation. In fact, it is intended that the "objects" discussed herein may be generated using any conventional approach, including but not limited to the aforementioned object-oriented approach.

In FIG. 2, there is shown an object 202, which may represent, for example, a fence post in a rural scene. There is shown a ground plane 204, which may represent, for example, a part of a farm where fence post 202 should be planted. On a point 206 of fence post 202, there is applied a magnet primitive. The magnet primitive applied at point 206 has a spherical search domain, whose range is defined by a radius 210. At point 208 of ground plane 204, there is applied a target primitive, representing the primitive that the magnet primitive at point 206 searches for in the database when the magnet primitive is activated. Both the magnet primitive at point 206 and the target primitive at point 208 may be applied by the modeler at model time.

When the magnet primitive at point 206 is activated, e.g., at assembly time when fence post 202 is brought into the scene, it will initiate a search for its corresponding target primitive, e.g., the target primitive at point 208 in this example. If the corresponding target primitive at point 208 comes within the range of the search domain of the magnet primitive, the magnet primitive at point 206 then completes its behavior. In the example of FIG. 2, the magnet primitive at point 206 has been predefined to complete its behavior by positionally aligning the object with which it is associated (i.e., fence post 202 of FIG. 2) with the object associated with the target primitive (i.e., ground plane 204 in this example) at the assembly points where the primitives are applied (i.e., points 206 and 208). When the magnet primitive at point 206 completes its behavior, points 206 and 208 would be made coincident in the scene, thereby causing fence post 202 to be planted on ground plane 204 at the coincident points 206/208.

In the example of FIG. 2, the primitives employed to illustrate the inventive concept of magnets and targets represents a relatively simple but powerful position alignment primitive. As will be discussed later herein, there are advantageously provided, in accordance with other embodiments of the present invention, other primitives and primitive composites, i.e., primitives bundled together to achieve more complex assembly-time behaviors, to afford the modeler the opportunity to express, at model time, an almost infinite variety of assembly-time behaviors.

Note that by assigning a magnet primitive to point 206 and a target primitive to point 208, the modeler advantageously specifies at model time the behavior of fence post 202 with respect to ground plane 204 during assembly. Once the primitives are applied to the objects at model time, the knowledge regarding the assembly points, e.g., points 206/208 of FIG. 2, as well as the assembly behavior (specified through the type of primitive selected) are advantageously embedded in the objects themselves. In this manner, it is no longer necessary for the programmer to understand how specific objects relate to one another. For example, the programmer does not need to know how a wheel may be specifically related to an axle in an automobile image. Instead, the programmer only needs to understand how a given primitive relates to another primitive.

Since the modeler can now directly "embed" into the objects themselves the behavioral knowledge required to assemble objects, the task of specifying how an object should behave during assembly may now be accomplished, in a user friendly and non-programming manner via the inventive convention, by the people most knowledgeable about the behaviors of the objects, i.e., the modelers themselves. The programmer may now simply write a general purpose assembly program that supports the inventive convention of primitives, and the specific behaviors are carried out by the objects themselves using their embedded knowledge during assembly. As long as the assembly program supports the necessary primitives, no customization of the assembly software is necessary when the assembly program is called on to assemble another scene involving new and different objects. This is in sharp contrast with prior art techniques, which require that a programmer be sufficiently schooled in the behaviors of the objects to be assembled in order to hardcode such behaviors into a customized assembly program.

Further, since the completion of the specified behavior is achieved through the objects themselves, there is no need to employ other external tools to manually perform the fine alignment of the objects. In one embodiment, the assembly needs to simply bring a magnet object and a target object toward each other. When the magnet associated with the magnet object detects its target within its search range, the fine alignment between the objects is preferably accomplished by the objects themselves using their embedded knowledge regarding their assembly-time behaviors. In the example of FIG. 2, for example, it is unnecessary to use an external software manipulation tool to manually move and align fence post 202 to ground plane 204 once the magnet at point 206 detects its target at point 208. Since fine manual manipulation is no longer necessary, the inventive objects may be assembled without requiring a high degree of manual dexterity on the part of the assembler and without the alignment and resolution errors typically associated with prior art manual manipulation techniques.

Figure 3:
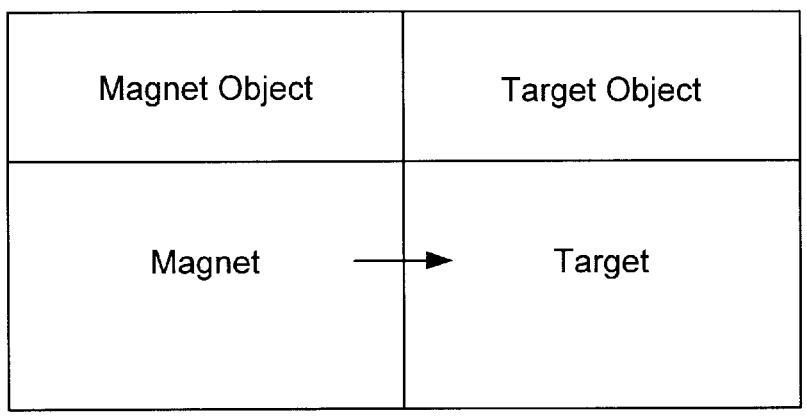
FIG. 3 illustrates, in accordance with one aspect of the present invention, the convention that permits a modeler to express at model time the assembly time behaviors of objects.

FIG. 3 summarizes, in accordance with one aspect of the present invention, the convention that permits the modeler to express, at model time, the assembly time behavior of an object. As shown in FIG. 3, the modeler may, at model time, associate a magnet with a magnet object, i.e., the object whose behavior at assembly time the modeler wishes to define. The magnet applied may be a magnet primitive, i.e., a simple magnet, or a magnet composite, i.e., a magnet made up of multiple magnet primitives. The association may be made, in one embodiment, by applying the magnet to a geometry associated with the target object. Depending on the type of magnet applied, the geometry associated with the magnet object may represent, for example, a point, a line, a vector, a plane, an arbitrary surface, or even on or inside a sphere. Further, the geometry may either be intimately coupled with the magnet object itself, e.g., directly on the magnet object, or may be offset therefrom. By applying a magnet at a geometry associated with the magnet object, the modeler can dictate that the magnet object behave in a certain way with respect to target object(s) in the scene during assembly.

A magnet is endowed with the knowledge regarding which target(s) it should be looking for. A target includes at least one target attribute that is applied to a geometry associated with a target object. The target attribute may be thought of as a search key that is the subject of the search by a specific magnet. Depending on the type of target applied, the geometry associated with the target object and to which the target attribute is painted may represent, for example, a point, a line, a vector, a vector field, a plane, an arbitrary surface, or even on or inside an arbitrary volume. Further, the geometry may either be intimately coupled with the target object itself, e.g., directly on the target object, or may be offset therefrom. The search key enables the magnet object, via its associated magnet, to find the target object among other objects in the data base. Once the magnet finds the target and the target object to which the target is applied, completion of the behavior predefined by the magnet may occur vis-à-vis the target object.

The target attribute (i.e., the search key) may represent a simple visual attribute, e.g., color, or an abstract attribute that may be non-visual, e.g., ground. The target attribute may even represent a combination of multiple simpler attributes, e.g., a ground plane that is covered with green grass, wherein ground plane and grass are abstract, non-visual attributes and green represents a visual attribute.

In accordance with one aspect of the present invention, the target attributes, i.e., the search keys, may be hierarchically arranged. The hierarchical arrangement of search keys allows a magnet to efficiently determine whether a particular geometry associated with an object satisfies its search criteria. By way of example, the hierarchy may be an "is a" hierarchy, wherein a child target attribute may inherit characteristics of its parent target attribute. By way of example, in a given "is a" hierarchy, the parent attribute may be, for example, a ground plane, and the child attribute may be, for example, a sidewalk. A sidewalk "is a" ground plane. A magnet searching for a ground plane can be satisfied by finding a geometry on which either the ground plane attribute or the sidewalk attribute is painted.

On the other hand, if a magnet is specified to seek only the sidewalk attribute, this magnet would not be satisfied by finding a geometry on which the ground plane attribute (but not the sidewalk attribute) is applied. The use of hierarchically arranged attributes or search keys for assembly time purposes advantageously improves the ability of the modeler to express search criteria.

The use of hierarchically arranged attributes in one embodiment to facilitate assembly-related specification of search criteria is in sharp contrast to the prior art's use of search criteria. In the prior art, search criteria are typically simple true/false flags (such as flags that mark a ground plane in a flight simulation program to determine whether the plane has crashed into the ground). Also, the simple flags of the prior art flight simulation programs are employed only for run-time purposes (e.g., during execution of the program that employs the assembled scene). In contrast, the attributes of the present invention may be more complex and may be employed, in one embodiment, only for assembling objects into scenes prior to the execution of the application program (e.g., the execution of the aforementioned flight simulator program).

In one embodiment, some or all of the magnets, targets, or targets' attributes may not need to be generated functionally by the modeler. In other words, it may not be necessary for the modeler to manually associate a magnet, a target, or a target's attribute with every object in the database. The modeler may generate these algorithmically, e.g., by applying a particular magnet, target, or target's attribute at a particular location for similar objects in the database. The level of sophistication of the algorithm may vary depending on needs, and may advantageously, in some cases, substantially reduce the repetition involved in associating magnets, targets, and targets' attributes with objects.

Once applied, the magnets and targets are stored in the database of objects along with their corresponding magnet objects and target objects. When the magnet object is called upon by a general purpose assembly program that supports the convention, e.g., during assembly time, its associated magnets are activated to begin their search in an attempt to complete their predefined assembly-time behaviors. Note that the application of these magnets and targets to objects are performed, in one embodiment, strictly for assembly purposes. Once the objects are assembled in a scene, the search keys and their corresponding magnets may play no role during the execution of the program that utilizes these scenes, e.g., when the plane of the previous flight simulator example flies over the assembled scene.

Figure 4:
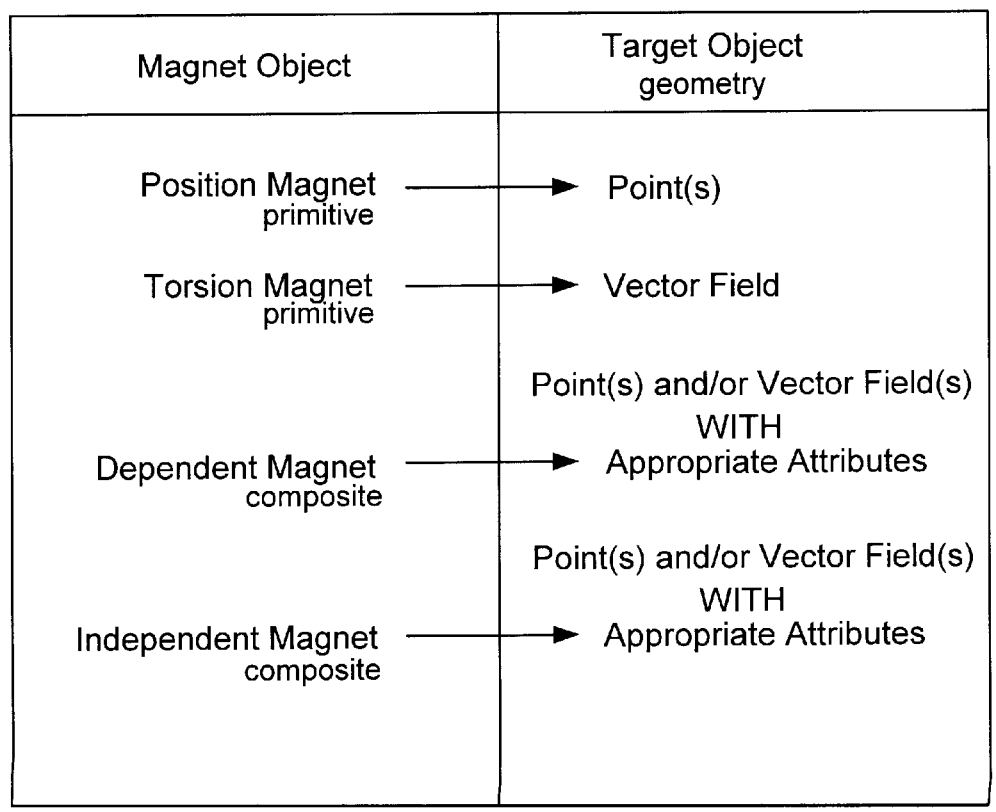
FIG. 4 illustrates, in accordance with one embodiment of the present invention, some magnets and the geometric entities associated with their targets.

FIG. 4 shows, in accordance with one embodiment of the present invention, some magnets and, corresponding with each magnet, the target geometry, i.e., the geometry associated with the target object on which target attributes may be applied. The target geometry may, in one embodiment, represent an entity employed for search purposes and may be abstract, or not even rendered. With reference to FIG. 4, there are shown two magnet primitives, a position magnet primitive and a torsion magnet primitive, and two magnet composites, a dependent magnet composite and an independent magnet composite.

A position magnet primitive is a type of magnet which, when applied to a geometry associated with a magnet object, enables the magnet object to achieve positional alignment with a target object. The positional alignment occurs at the point or points where the position magnet primitive is applied.

With reference to the example of FIG. 2, for example, there is a position magnet primitive at point 206 which, when activated, seeks the corresponding attribute of the position target primitive (at location 208). The corresponding attribute that is sought by the position magnet primitive may represent any searchable attribute and may include non-visual, abstract attributes (e.g., ground plane) as well as visual attributes (e.g., color). The search may be spatially limited to, for example, the search range defined by radius 210.

Once the position magnet primitive finds the desired target attribute it is looking for within its search range, e.g., when the assembler roughly moves the magnet object and/or the target object to place the target in the search range of the position magnet primitive, the position magnet primitive will attempt to complete its assembly-time behavior. Since the target object geometry is a point or points (as shown in FIG. 4), the position magnet primitive may select the closest point among the set of points that have the attribute the position magnet primitive is looking for. It then aligns the assembly geometries, i.e., aligning the geometry at which the position magnet primitive is applied with the geometry at which the target attribute is applied. In the example of FIG. 2, these two assembly geometries are points 206 and 208. The alignment of these two points has the effect of positionally aligning fence post 202 with ground plane 204 in the example of FIG. 2.

Figure 5:
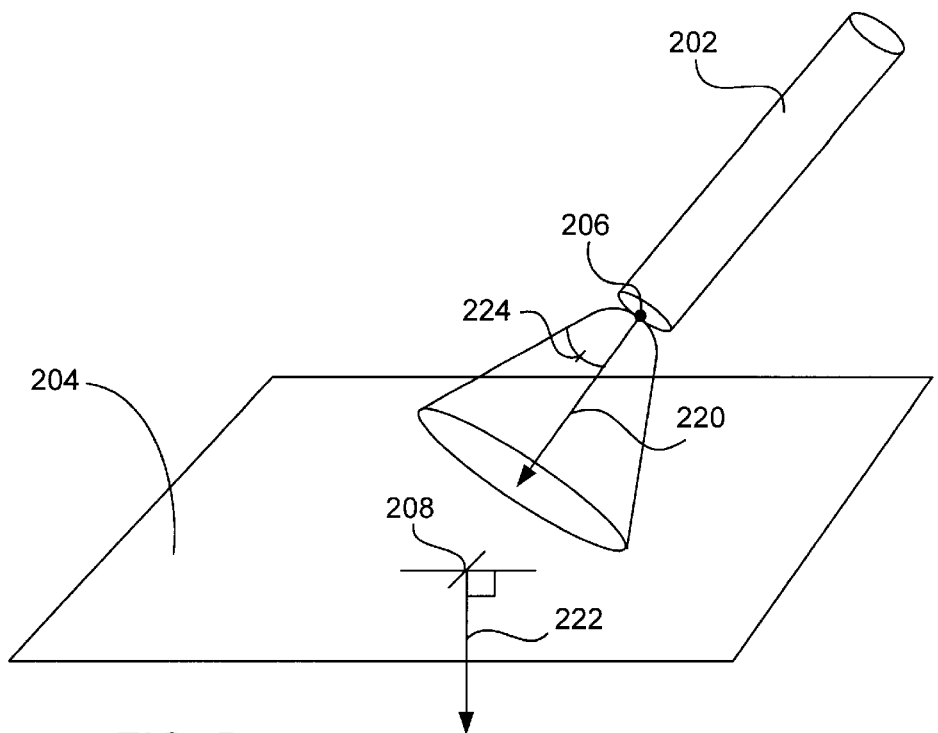
FIG. 5 illustrates, in accordance with one aspect of the present invention, the features and operation of a torsion magnet primitive.

The torsion magnet primitive of FIG. 4 may be better understood with reference to the example of FIG. 5. In FIG. 5, it is again desired to plant fence post 202 in ground plane 204 using assembly points 206 and 208 respectively. In FIG. 5, however, it is further desired that fence post 202 be aligned vertically with respect to ground plane 204. For this purpose, a torsion magnet primitive is applied to point 206.

A torsion magnet primitive represents a pure vector that searches for vector fields in order to achieve vector alignment. By way of example, the function of the torsion magnet primitive applied at point 206, when activated, is to look for a vector field 222 with the appropriate target attribute applied thereto. Vector field 222, along with the target attribute that is painted on it, represents the target primitive of the torsion magnet primitive applied at point 206. The search domain of the torsion magnet primitive can be any specified spatial domain and is preferably defined by a search cone, which is specified in the example of FIG. 5 by an angle parameter 224 from pure vector 220 of the torsion magnet primitive. If the search is satisfied, the torsion magnet primitive applied at point 206 may complete its behavior by aligning pure vector 220 of the torsion magnet primitive with vector 222 of its corresponding target primitive (applied at point 208 in ground plane 204), thereby permitting fence post 202 to be aligned upright with respect to ground plane 204.

In one embodiment, the search domain of the torsion magnet primitive applied at point 206 may be substantially limited when points 206 and 208 are first allowed to align positionally, e.g., through a position magnet primitive and a corresponding target primitive also applied at points 206 and point 208. For this very reason, a torsion magnet primitive is sometimes bundled together with a position magnet primitive at a given geometry (e.g., at point 206 of fence post 202) to allow the magnet object (e.g., fence post 202) to become positionally aligned with the target object (e.g., ground plane 204) first before the torsion magnet primitive is activated to perform its vector or rotational alignment function.

The bundling of a torsion magnet primitive with a position magnet primitive represents one technique for achieving complex assembly-time behaviors from seemingly simple primitives. In accordance with one aspect of the present invention, any number of magnet primitives may be bundled together to form a magnet composite to achieve a complex assembly-time behavior. By way of example, FIG. 4 shows a dependent magnet composite, representing a composite of multiple interdependent magnet primitives. The magnet primitives bundled in a dependent magnet composite are said to act in an interdependent manner since there is at least some coordination among the member primitives.

Figure 6:
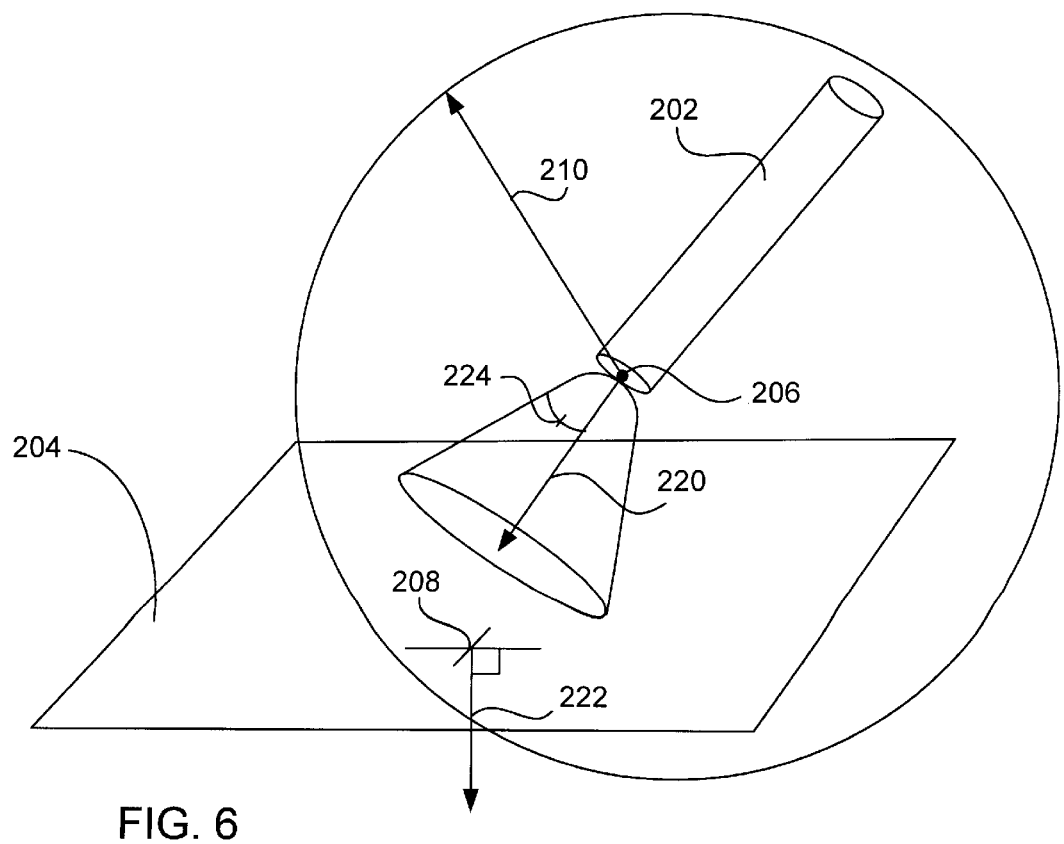
FIG. 6 illustrates, in accordance with one aspect of the present invention, the features and operation of a dependent magnet composite.

An example of a dependent composite magnet has been discussed earlier with regard to the bundling of a torsion magnet primitive with a position magnet primitive at a geometry to limit the search domain of the torsion magnet primitive. To further elaborate on the features and advantages of dependent magnet composites, reference may be made to the example of FIG. 6. In FIG. 6, there are applied at point 206 of fence post 202 two interdependent magnet primitives: a position magnet primitive and a torsion magnet primitive. Although each magnet primitive by itself is capable of independently searching for its corresponding attribute, the position magnet primitive is preferably activated first and allowed to complete its behavior by aligning point 206 to point 208 before the torsion magnet primitive is activated to rotate fence post 202 to an upright position, i.e., align vectors 220 and 222.

It should be borne in mind that although a specific dependent magnet composite, i.e., the pin-helper composite which comprises a position magnet primitive and a torsion magnet primitive, is discussed herein to facilitate understanding, a dependent magnet composite may in fact comprise any combination of interdependent magnet primitives or composites. Further, the modeler may specify any arbitrary relationship between the member magnet primitives and composites of a dependent magnet composite to achieve almost any desired assembly-time behavior. For example, the modeler may specify that a first set of the member magnet primitives operate in a sequential manner, and a second set of the member magnet primitives operate in parallel, or any combination thereof As can be appreciated from the foregoing, dependent magnet composites are advantageous in the modeling of assembly-time behaviors of objects since almost any desired behavior can be expressed by a combination of interdependent primitives.

Note that it is possible to apply multiple magnet primitives to a given geometric entity, e.g., point 206 of FIG. 6, since the magnet primitives may be implemented, in one embodiment, as abstract, nonvisual entities applied to facilitate assembly of scenes. As such, the number and variety of primitives applied to a given geometry, e.g., a point on an object, may be infinite, and the behavior of the magnet object at any instance in time depends on which magnet primitive has found its corresponding target primitive and has completed its behavior.

Further, it is possible to create a composite target at a specific target geometry. By way of example, a given point on a target object may have associated with it multiple position and torsion target primitives, representing the targets for different magnet primitives and composites. These multiple position and torsion target primitives may all have different attributes, which serve as search keys to help the different magnets and composites find their targets and complete their intended behaviors. At this target point, the behavior of a given magnet object depends on which specific magnet primitive and/or composite is applied to that magnet object.

For example, a pin-helper A1 applied on a magnet object M1 may have a position magnet primitive P1 that looks for an attribute X1. When position magnet primitive P1 completes its behavior, pin-helper A1 then activates a bundled torsion magnet primitive T1 to search for an attribute Y1. On another magnet object M2, there may be placed a position magnet primitive P2, which looks for an attribute X2.

For the present example, assume that the targets for these primitives P1, T1, and P2 are all applied at the same target point on the target object. Although magnet objects M1 and M2 both search for their target attributes at this target point, their behavior with respect to the target object at this target point may be completely different. In this example, magnet object M1, via its applied pin-helper composite A1, aligns itself, both positionally and rotationally, to the target object at this composite target point. On the other hand, magnet object M2, via its position magnet primitive A2, may simply positionally align itself with the target object at this same composite target point without regard to its orientation.

Even if two magnet objects have a similar type of magnet applied to them, their responses may be completely different at a composite target point due to the fact that they may be searching for different search keys. For example, two torsion magnet primitives may look for two different attributes associated with two different vectors having their origins at the same target point. Consequently, each magnet object may be aligned with its own target vector at this same target point. Note that since the target primitives may be abstract and nonvisual, an almost unlimited number of target primitives may be associated with a given composite target, thereby flexibly enriching the range of assembly time behaviors that can be achieved by different magnet objects at this composite target.

Figures 7, 8:
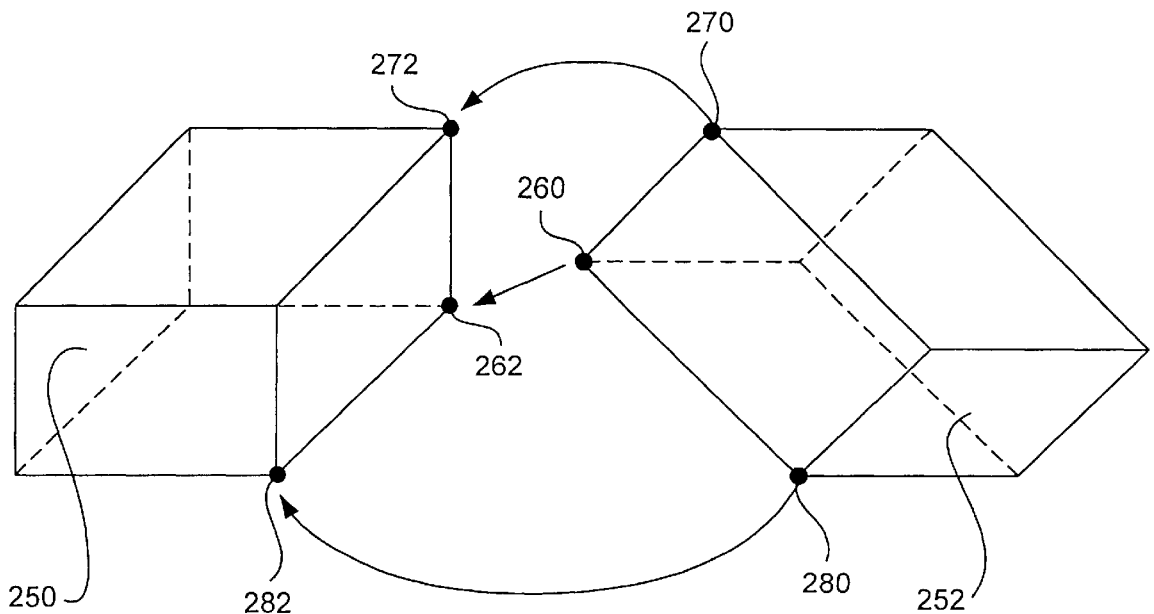
FIG. 7 illustrates, in accordance with one aspect of the present invention, the features and operation of an independent magnet composite.
FIG. 8 illustrates, in accordance with one aspect of the present invention, the sets of parameters that may be employed to define a position magnet primitive and a torsion magnet primitive.

Multiple independently acting magnet primitives may also be bundled together to form a magnet composite. In FIG. 4, such a magnet composite is shown therein as an independent magnet composite (as opposed to the earlier discussed dependent magnet composite). The features and advantages of an independent magnet composite may be better understood with reference to the example of FIG. 7. In FIG. 7, there are shown two cubes 250 and 252. At model time, the modeler may specify their assembly-time behaviors relative to each other through an independent magnet composite that comprises three independently acting magnet primitives.

In the present example, three independent position magnet primitives are applied to vertices on the magnet cube 252, and three corresponding target primitives are applied to vertices on the target cube 250. The first position magnet is applied to vertex 260. The first target attribute, corresponding to the first position magnet primitive at vertex 260, is applied at vertex 262 of cube 250. The second position magnet primitive is applied at vertex 270 of cube 252. Its corresponding target attribute is applied at vertex 272 of cube 250. The third position magnet primitive is applied at vertex 280 of cube 252. Its corresponding target attribute is applied at vertex 282 of cube 250.

During assembly, the three separately independently acting primitive pairs 260/262, 270/272, and 280/282 achieve the effect of first positionally aligning two vertices 260 and 262 of cubes 250 and 252 (when the first position magnet primitive applied at vertex 260 completes its behavior). Next, cube 252 is rotated to align with cube 250 along a pin edge when the second position magnet primitive applied at vertex 270 completes its behavior. The pin edge along which cube 250 is aligned with cube 252 is shown in FIG. 7 as the edge defined by vertices 260–270. Next, cube 252 is rotated to align with cube 250 along a cube face (defined by vertices 260, 270, and 280) when the third position magnet primitive (applied during model time at vertex 280) completes its behavior.

It should be borne in mind that although only position magnet primitives are employed in FIG. 7 to simplify the illustration of independent magnet composites, there may be included in an independent magnet composite any combination of position magnet primitives, torsion magnet primitives, and composites. Likewise, a dependent magnet composite (discussed earlier in connection with FIG. 4 and the example of FIG. 6) may include any combination of position magnet primitives, torsion magnet primitives, and composites. As can be appreciated from the foregoing, independent magnet composites are advantageous in the modeling of assembly-time behaviors since they, like their sister dependent magnet composites, can be employed by the modeler at model time to express almost any desired assembly-time behavior.

FIG. 8 illustrates the sets of parameters that may be employed to define a position magnet primitive and a torsion magnet primitive in accordance with one aspect of the present invention. As shown in FIG. 8, a position magnet primitive has a vector component that is a position vector, i.e., a vector that may be specified relative to an origin of a coordinate space. The position magnet primitive may also have an associated search range. The search range represents the domain in space within which the magnet primitive conducts its search for its target attribute. In the case of a position magnet primitive, the search range may be represented by a sphere or a portion thereof, which may be specified by a radius value.

A magnet primitive searches for its target attribute. As shown in FIG. 8, the attributes that may be searched by a position magnet primitive may include any attribute, whether visual or non-visual. The attribute to be searched is typically applied to a geometry associated with the target object. As discussed herein in connection with FIG. 9, the geometry to which an attribute of a position magnet target is applied may represent any arbitrary geometric entity and may include, for example, a point, a line, a plane, an arbitrary surface, a volume, and the like.

A torsion magnet primitive has a vector component that is a pure vector, i.e., a vector whose origin may not be specifically related to an origin of a coordinate space. The torsion magnet primitive may also have an associated search range. In the case of a torsion magnet primitive, the search range may represent a conical volume, which may be specified by an angle value parameter from the pure vector of the torsion magnet primitive to the target vector. The attributes sought by a torsion magnet primitive may include any attribute, whether visual or non-visual, that may be applied to the target vector field.

FIG. 9 illustrates the sets of parameters that may be employed in one embodiment to define the target for the position magnet primitive ("the position target primitive") and the target for the torsion magnet primitive ("the torsion target primitive"). In FIG. 9, a position target primitive has a target geometry component and a target attribute component. The target attribute may represent any attribute that may be searched, e.g., any of the non-visual or visual attributes that may be employed as search keys in the database or in a scene.

The target attribute is applied to a target geometry which, in the case of the position target primitive, may represent a position vector, i.e., a vector that may be specified relative to an origin of a coordinate space. In one embodiment, the target attribute of a position target primitive may be applied to any geometric entity such as point(s), line(s), plane(s), generic surface(s), or volume(s), associated with the target object. When a position magnet primitive finds within its search range one or more geometric entities having the desired target attribute, i.e., the attribute it looks for, the position magnet primitive then completes its behavior, i.e., brings the magnet object and target object together into positional alignment.

As shown in FIG. 9, the torsion target primitive has an attribute component that may represent any searchable attribute in a database or in a scene. The torsion target primitive further has, in one embodiment, a vector field component. As the term is used herein, a vector field represents a distribution of vectors, e.g., pure vectors whose origins may not be specifically related to a point in a coordinate space, i.e., the vector field is employed to indicate orientation only. When a torsion magnet primitive finds within its search cone one or more vectors having the target attribute, i.e., the attribute it looks for, the torsion magnet primitive preferably aligns its pure vector with the most closely aligned vector field having the appropriate attribute, thereby aligning the magnet object with its corresponding target object.

FIG. 10 illustrates some examples of dependent magnet composites which, as discussed in connection with FIG. 4, may be formed from multiple dependent magnet primitives, e.g., position magnet primitives and torsion magnet primitives that act cooperatively. In FIG. 10, there is shown a dependent magnet composite pin-helper, which includes a position magnet primitive and a torsion magnet primitive as discussed in FIG. 4. The position magnet primitive of dependent magnet composite pin-helper is preferably activated first to positionally align the magnet object and the target object. When the position magnet primitive completes its behavior, the torsion magnet primitive of the pin-helper is then preferably activated to rotate the magnet object to bring it into vector alignment with the target object (as discussed in the example of FIG. 6). As mentioned earlier, the bundling of a position magnet primitive with a torsion magnet primitive advantageously limits the search domain of the vector search of the torsion magnet primitive, thereby making the alignment process more robust. It should be noted, however, that it is possible, in one embodiment, to first activate the torsion magnet primitive to align a magnet object to its target object before turning on the position magnet primitive to perform the positional alignment.

FIG. 10 also shows another dependent magnet composite, a weld-helper, which includes a position magnet primitive and two torsion magnet primitives: torsion magnet primitive A and torsion magnet primitive B. The position magnet primitive of the dependent magnet composite weld-helper is typically activated first to positionally align the magnet and target objects. When the position magnet primitive completes its behavior, torsion magnet primitive A and torsion magnet primitive B may be turned on, either sequentially or in parallel. Torsion magnet primitive A may perform the primary torsional alignment role, and torsion magnet primitive B may perform the secondary torsional alignment role.

When torsion magnet primitive A completes its behavior, the objects are both positionally aligned (due to the action of the position magnet primitive) and rotationally aligned with respect to a first pair of vectors (due to the action of the first torsion magnet primitive). Note that when the first torsion magnet primitive completes its behavior, the behavior of the weld-helper up to that moment is similar to that of a pin-helper. When torsion magnet primitive B of the weld-helper dependent magnet composite completes its behavior, full alignment along the pin axis is achieved to fix the rotation, i.e., the magnet and target objects are locked together and fully constrained to prevent rotation relative to each other. Although only two exemplar dependent magnet composites are discussed herein, it should be appreciated that other types of composites, both dependent magnet composites and independent magnet composites, may be created from any arbitrary combination of position magnet primitives, torsion magnet primitives and their composites to achieve any arbitrary assembly-time behavior.

In accordance with one particularly advantageous aspect of the present invention, the modeler can specify at model time in a non-programming and user-friendly manner the behavior of objects during assembly by following the convention of magnets and targets. When the objects are so specified at model time, their assembly-time behaviors are advantageously embedded in the objects themselves. Subsequently, any general purpose program that supports the convention of magnets and targets may cause the objects to be correctly assembled.

In accordance with this aspect of the present invention, it is not necessary for the general purpose assembly program to be customized for the kind of objects it is assembling and to know what kind of specific behaviors should be expressed by specific objects. The behaviors themselves are expressed during assembly time via the dialogs between the magnets and their targets using the knowledge embedded in the objects themselves. These dialogs advantageously cause the target objects and the magnet objects to be assembled in the manner intended by the modeler. This is in sharp contrast with prior art scene creation techniques in which the objects to be assembled are essentially "dumb" objects and must be assembled in a manual and tedious manner by the assembler or hardcoded to assemble in specific ways by the programmer via a customized program.

Figure 11:
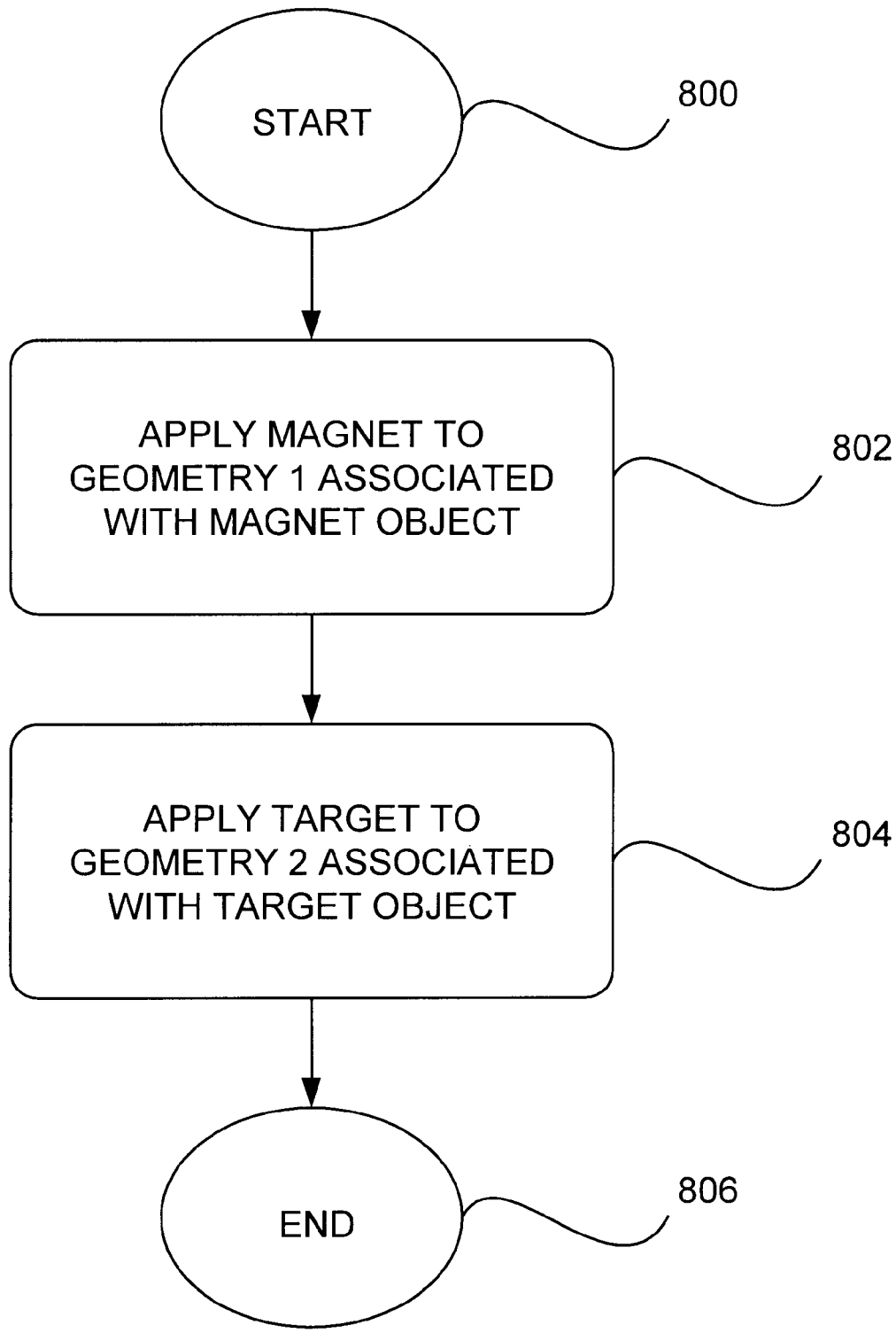
FIG. 11 illustrates, in accordance with one aspect of the present invention, the steps involved when a modeler, at model time, employs the inventive convention of magnets and targets to specify the assembly-time behaviors of objects.

FIG. 11 illustrates the steps involved when a modeler, at model time, employs the inventive convention of magnets and targets to specify the assembly-time behaviors of objects. In step 802, the modeler applies a magnet or magnets to a geometry associated with the magnet object. By way of example, the modeler may apply a magnet primitive, such as a position magnet primitive, to a point on a magnet object in step 802.

In step 804, the modeler may apply the corresponding target primitive(s) to a geometry associated with the target object. By way of example, the modeler may apply the target primitive corresponding to the aforementioned position magnet primitive to a point on the target object in step 804. Note that the purpose of steps 802 and 804 is to endow two objects with a magnet and a corresponding target, and these steps may be performed in any order, e.g., the modeler may apply the target primitive to the target object prior to applying the magnet primitive to the magnet object. In one embodiment, the modeler may apply primitives, such as a magnet or a target primitive, using a computer implemented process that employs any of the conventional computers. The computer implemented process may, in one embodiment, represent a modeling software program that has been designed to permit the modeler to apply primitives to objects.

When steps 802 and 804 are completed, the magnet object and the target object would embed within themselves the knowledge of their behaviors relative to each other during assembly time. When the magnet object and the target object are brought into a scene, for example by the assembler using a generic rough positioning tool, the fine alignment behaviors required to assemble objects may be expressed by a general purpose assembly program that supports the convention of magnets and targets. As mentioned earlier, the embedding of the assembly-time behavior knowledge renders it unnecessary to customize the general purpose assembly program for specific magnet objects and target objects. In other words, the invention enables a general purpose assembly program, through the inventive convention, to assemble any set of objects that supports the convention.

Figure 12:
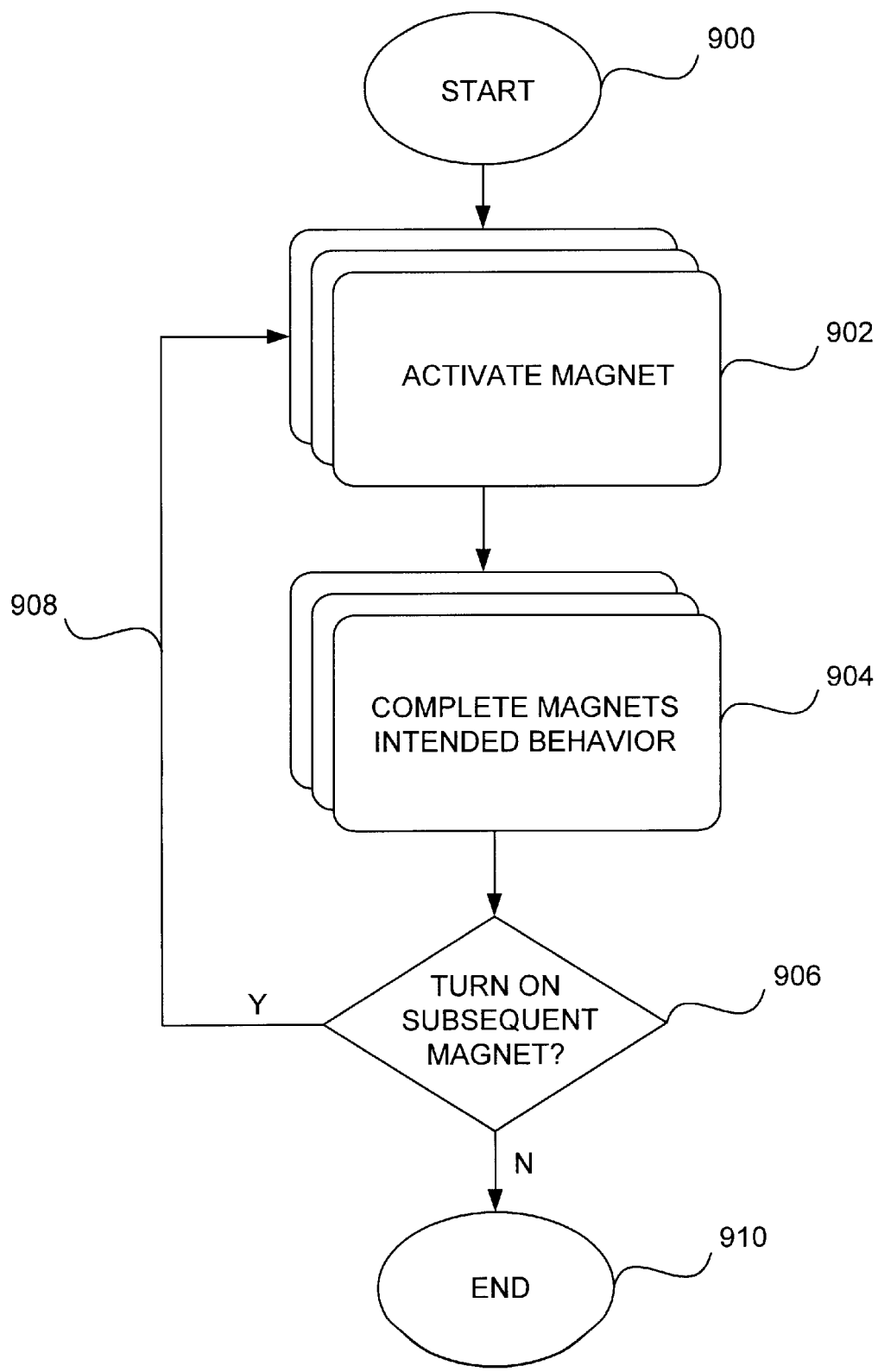
FIG. 12 illustrates, in accordance with one aspect of the present invention, the steps involved in assembling two objects.

FIG. 12 illustrates, in accordance with one aspect of the present invention, the steps performed when two objects that have been endowed with a magnet (either a magnet primitive or a magnet composite) and a corresponding magnet target are placed in a scene within the magnet's search range, e.g., by the assembler. In one embodiment, the steps of FIG. 12 may be implemented as part of a computer-implemented process, e.g., a computer software program, that may employ any conventional computer. In step 900, it is assumed that a magnet object having an appropriate magnet applied thereto and a target object having a corresponding magnet target applied thereto are placed in a scene within the magnet's search range.

In step 902, the magnet associated with the magnet object is activated. The magnet may be predefined to activate upon any arbitrarily specified condition, e.g., when the assembler brings the magnet object into a scene, or any other condition. If the magnet object includes multiple parallel acting magnets, they may all be activated in step 902 (as graphically depicted in FIG. 12 by the multiple overlapping magnet activating steps). In step 904, the magnet(s) activated in step 902 completes its behavior. For example, if the magnet activated in step 902 is a position magnet primitive, step 904 would represent the completion of the position magnet primitive's behavior, i.e., the positional alignment of the magnet object and the target object at the assembly points. If multiple parallel acting magnets are activated in step 902, some or all may be completed in step 904.

In step 906, the method ascertains whether another magnet should be activated. Another magnet may be activated if, for example, a dependent magnet composite such as the aforementioned pin-helper, has been applied to the magnet object. If it is ascertained in step 906 that a subsequent magnet should be activated, the method returns to step 902 via path 908 to activate the next magnet. The process may continue until there are no more magnets to be activated (as ascertained in step 906). When all magnets have completed their behaviors, the method proceeds from step 906 to step 910, representing the end of the steps of FIG. 12.

Figure 13:
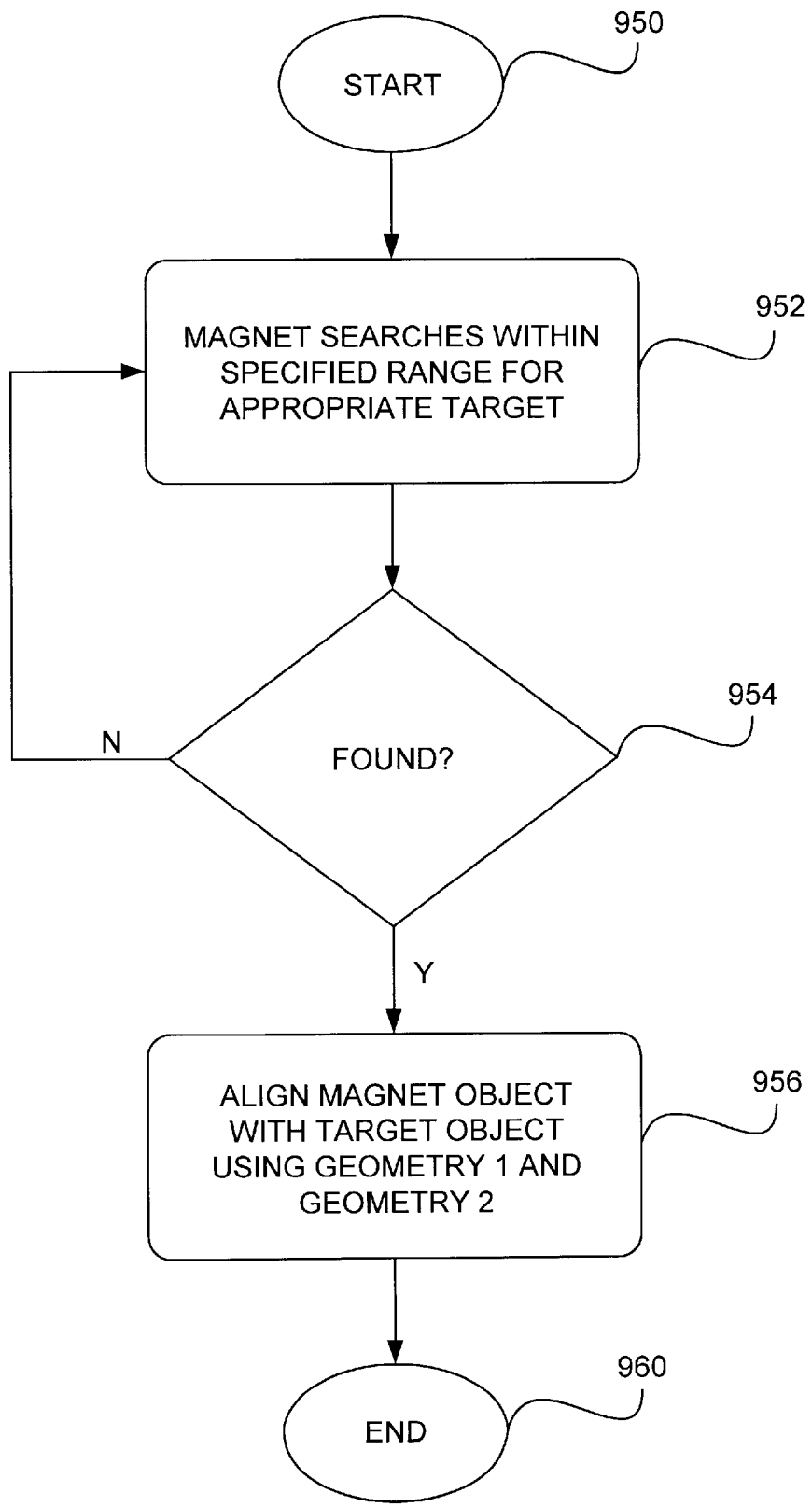
FIG. 13 shows, in greater detail and in accordance with one embodiment of the present invention, the steps involved when a magnet completes its intended assembly-time behavior.

FIG. 13 shows, in greater detail and in accordance with one embodiment of the present invention, step 904 of FIG. 12, wherein a magnet completes its intended behavior. In one embodiment, the steps of FIG. 13 may be implemented as part of a computer-implemented process, e.g., a computer software program, that may employ any conventional computer. In step 950, it is assumed that the magnet has been activated (in step 902 of FIG. 12, for example). In step 952, the magnet searches within its search range for the appropriate magnet target. For example, if the magnet represents a position magnet primitive, it may search within its spherical search range for its target attribute. The radius of the sphere may also be specified in advance by the modeler to limit the domain of this search.

If the search is not successful (as determined in step 954) the magnet preferably continues to search until the search is satisfied. If the search is satisfied, the geometry associated with a magnet object to which the magnet is applied is aligned, in step 956, with the geometry associated with a target object to which the magnet target is applied. For example, if the magnet is a position magnet primitive, the assembly points on the magnet object and the target objects are aligned in step 956. Note that the steps of FIG. 13 may be repeated many times if multiple magnet/target pairs are involved.

Note that the invention also advantageously makes it unnecessary to employ any external manipulation tools to precisely assemble the objects. The objects themselves contain the knowledge of how they should align at assembly time. As long as the general purpose assembly program contains some functions for positionally and rotationally aligning two generic objects, for example, these functions may be called upon by the objects themselves to complete their behaviors. Since fine manual manipulation is no longer necessary, objects supporting the inventive convention of magnets and targets may be more efficiently assembled.

Further, the fact that the objects of the present invention are "smart" and can essentially assemble themselves (via a general purpose assembly program that supports the convention) advantageously allows scenes to be assembled without requiring skilled assemblers and without requiring the modeler to invest a great amount of time ensuring that the assembler understand how objects should be put together. More importantly, the fact that the objects can essentially perform the fine alignment themselves advantageously renders it virtually impossible for the assembler to introduce alignment-related errors into the assembly process.

While this invention has been described in terms of several preferred embodiments, there are alterations, permutations, and equivalents which fall within the scope of this invention. By way of example, although the present disclosure uses the example of model-time specification and assembly-time behaviors to discuss the inventive convention of magnets and targets, it should be appreciated that such a convention may be employed as a general, user-friendly way of specifying behaviors among objects at any time. In almost any application involving objects whose behaviors relative to each others need to be expressed, the behaviors can be embedded into the objects themselves using the inventive convention of magnets and targets. Using a general purpose program that supports the convention and a set of functions that allow two generic objects to behave in predefined ways toward one another, the objects created using the present inventive convention may express themselves simply by calling on these generic functions and without requiring the extensive customization of the executing software. Thus, it is contemplated that the inventive convention is not limited only to graphics applications or to the specification of object behaviors at model time or to the expression of object behaviors at assembly time.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for generating objects configured for assembly into a scene during assembly time, comprising:

associating a magnet with a first object; and associating a target with a second object, said target having a searchable target attribute that is independent of said second object's geometry, said magnet being configured to search for said target within a predefined search range when said magnet is activated, said magnet and said target having alignment data for permitting said first object and said second object to align themselves relative to each other in accordance with said alignment data during said assembly time.

2. The method of claim 1 further comprising:

bringing said first object and said second object within said predefined search range.

3. The method of claim 1 wherein said magnet is a position magnet primitive.

4. The method of claim 1 wherein said magnet is a torsion magnet primitive.

5. The method of claim 1 wherein said magnet is a magnet composite, said magnet composite comprising at least two magnets.

6. The method of claim 5 wherein said magnet composite is a dependent magnet composite, said at least two magnets of said dependent magnet composite behave cooperatively to align said first object and said second object.

7. The method of claim 6 wherein said dependent magnet composite is a pin-helper composite, said pin-helper composite comprising a position magnet primitive and a torsion magnet primitive, said torsion magnet primitive being activated after said position magnet primitive completes its behavior.

8. The method of claim 6 wherein said dependent magnet composite is a weld-helper composite, said weld-helper composite comprising a position magnet composite and two torsion magnet composites.

9. The method of claim 5 wherein said magnet composite is an independent magnet composite, said at least two magnets of said independent magnet composite behave independently while aligning said first object and said second object.

10. The method of claim 1 wherein said searchable target attribute represents an abstract attribute.

11. The method of claim 10 wherein said searchable target attribute is a non-visual attribute specified only for assembly purpose.

12. A computer implemented method for assembling a first object and a second object into a scene, comprising:

applying a magnet to a first geometry, said first geometry being associated with said first object;

applying a target to a second geometry, said second geometry being associated with said second object, said target having a searchable target attribute that is independent of said second object's geometry; and activating said magnet upon a predefined condition, thereby permitting said magnet to search for said target within a predefined search range, said magnet completes its predefined behavior with respect to said target if a search by said magnet is successful, thereby aligning said first object and said second object relative to each other in accordance with alignment data contained in said magnet and said target.

13. A computer implemented method for assembling a scene, comprising:

providing a first object, said first object having an associated target; and providing a second object, said second object having an associated magnet, said target having a searchable target attribute that is independent of said second object's geometry, said magnet being configured to search for said target within a predefined search range when said magnet is activated, said magnet and said target having alignment data for permitting said first object and said second object to align themselves relative to each other in accordance with said alignment data.

14. The method of claim 13 further comprising:

bringing said first object and said second object within said predefined search range.

15. The method of claim 13 wherein said magnet is a position magnet primitive.

16. The method of claim 13 wherein said magnet is a torsion magnet primitive.

17. The method of claim 13 wherein said magnet is a magnet composite, said magnet composite comprising at least two magnets.

18. The method of claim 17 wherein said magnet composite is a dependent magnet composite, said at least two magnets of said dependent magnet composite behave cooperatively to align said first object and said second object.

19. The method of claim 18 wherein said dependent magnet composite is a pin-helper composite, said pin-helper composite comprising a position magnet primitive and a torsion magnet primitive, said torsion magnet primitive being activated after said position magnet primitive completes its behavior.

20. The method of claim 18 wherein said dependent magnet composite is a weld-helper composite, said weld-helper composite comprising a position magnet composite and two torsion magnet composites.

21. The method of claim 13 wherein said searchable target attribute represents an abstract attribute.

22. The method of claim 21 wherein said searchable target attribute is a non-visual attribute specified only for assembly purpose.

* * * * *